United States Patent
Tushie et al.

(10) Patent No.: US 6,202,155 B1
(45) Date of Patent: Mar. 13, 2001

(54) VIRTUAL CARD PERSONALIZATION SYSTEM

(75) Inventors: David R. Tushie, Eden Prairie; Steven J. Schaub, Bloomington; Thomas L. Younger, Wayzata, all of MN (US)

(73) Assignee: UBIQ Incorporated, Minneapolis, MN (US)

( * ) Notice: Subject to any disclaimer, the term of this patent is extended or adjusted under 35 U.S.C. 154(b) by 0 days.

(21) Appl. No.: 09/126,363

(22) Filed: Jul. 30, 1998

Related U.S. Application Data

(63) Continuation-in-part of application No. 08/755,459, filed on Nov. 22, 1996, now Pat. No. 5,889,941.

(51) Int. Cl.[7] ............................................. G06F 11/00
(52) U.S. Cl. ................................. 713/200; 340/825.31
(58) Field of Search ................................ 713/200, 201, 713/202; 380/4, 19, 20, 22, 23, 25; 340/825.31, 825.34; 235/382.5, 380; 707/104, 10

(56) References Cited

U.S. PATENT DOCUMENTS

| 4,529,870 | * | 7/1985 | Chaum ................................. 235/380 |
| 4,772,782 | | 9/1988 | Nonat .................................. 235/380 |
| 4,825,054 | | 4/1989 | Rust et al. ........................... 235/380 |
| 4,827,425 | | 5/1989 | Linden ................................ 364/478 |
| 4,866,259 | | 9/1989 | Bonnemoy ........................... 235/475 |
| 4,874,935 | | 10/1989 | Younger .............................. 235/492 |
| 4,882,474 | | 11/1989 | Anderl et al. ....................... 235/380 |
| 5,025,399 | | 6/1991 | Wendt et al. ....................... 364/519 |
| 5,266,781 | | 11/1993 | Warwick et al. .................... 235/375 |
| 5,332,889 | | 7/1994 | Lundstrom et al. ................. 235/380 |
| 5,378,884 | | 1/1995 | Lundstrom et al. ................. 235/441 |
| 5,442,165 | | 8/1995 | Atsumi et al. ....................... 235/492 |
| 5,442,567 | * | 8/1995 | Small ................................... 364/479 |
| 5,513,117 | * | 4/1996 | Small ................................... 364/479 |
| 5,534,857 | | 7/1996 | Laing et al. ..................... 340/825.34 |
| 5,578,808 | | 11/1996 | Taylor ................................. 235/380 |
| 5,684,742 | | 11/1997 | Bublitz et al. .................. 365/189.01 |
| 5,789,726 | * | 8/1998 | Ray et al. ............................ 235/380 |
| 5,889,941 | * | 3/1999 | Tushie et al. ....................... 395/186 |
| 6,012,635 | * | 1/2000 | Shimada et al. .................... 235/380 |
| 6,014,748 | * | 1/2000 | Tushie et al. ....................... 713/200 |
| 6,078,928 | * | 6/2000 | Schnase et al. ..................... 707/104 |

FOREIGN PATENT DOCUMENTS

| 19536548 | 9/1995 | (DE) | ................................. G06F/9/45 |
| 430257 | 6/1991 | (EP) | ................................. G07F/7/10 |
| 778553 | 6/1997 | (EP) | ................................. G07F/7/10 |
| 95/22810 | 8/1995 | (WO) | ................................ G07F/7/12 |
| 97/39424 | 10/1997 | (WO) | ................................ G06K/19/06 |

* cited by examiner

*Primary Examiner*—Nadeem Iqbal
(74) *Attorney, Agent, or Firm*—Schwegman, Lundberg, Woessner & Kluth, P.A.

(57) ABSTRACT

A virtual card personalization system receives information to personalize a transaction card and creates a virtual transaction card using the information. Virtual devices in the system control physical personalization equipment which is used to produce the transaction card based on data in the virtual transaction card. Each virtual device converts the virtual transaction card data specific to its function into a format recognizable by the personalization equipment it controls and instructs the personalization equipment to process the converted data to produce the physical transaction card.

29 Claims, 9 Drawing Sheets

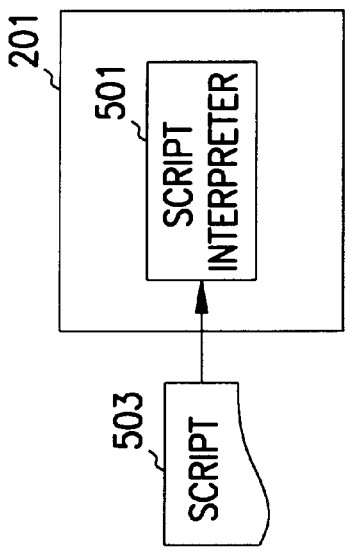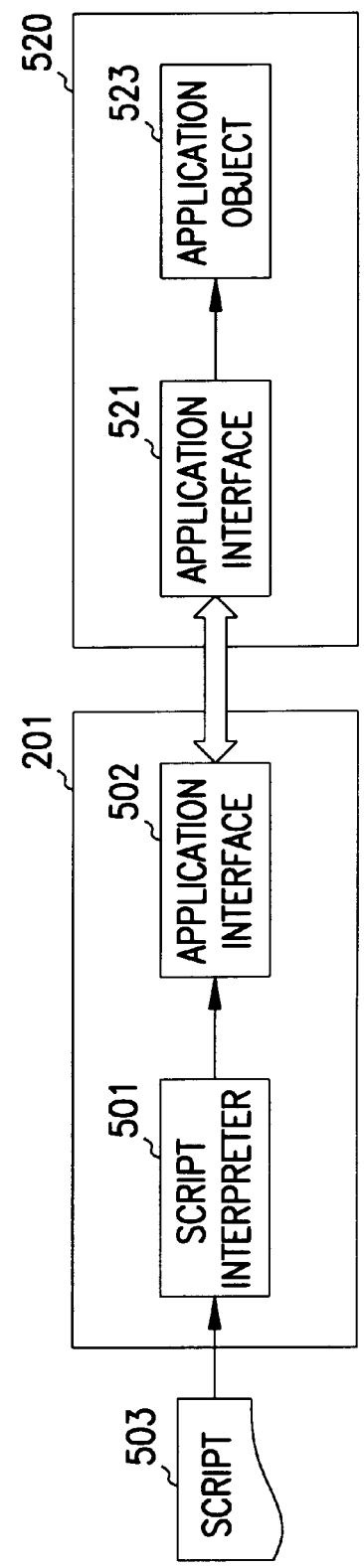
FIG. 5A
FIG. 5B

VIRTUAL CARD PERSONALIZATION SYSTEM

CROSS REFERENCE TO RELATED APPLICATIONS

This application is a CIP of application Ser. No. 08/755,459 filed on Nov. 22, 1996 now U.S. Pat. No. 5,889,941.

FIELD OF THE INVENTION

The present invention is related to portable programmed data carriers (smart cards) and in particular to producing portable programmed data carriers such as credit cards, debit cards, identification cards, and other transaction cards.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, UBIQ Incorporated, All Rights Reserved.

BACKGROUND OF THE INVENTION

Standard transaction cards such as regular credit cards are familiar to most people. A transaction card usually has information about the cardholder, such as name and account number, printed and/or embossed on the surface of the card. Transaction cards frequently contain a magnetic stripe which is encoded with cardholder data as well. The process of printing/embossing/encoding the cardholder data on each transaction card is known as "personalization." Each transaction card also undergoes a process known as "initialization" in which certain types of information common to all cards in a batch, such as an issuer identifier and batch number, are placed on the card.

Existing transaction cards encode such data in a magnetic stripe on the back of the card but the amount of data that can be held by a magnetic stripe is limited. A new type of transaction card embeds a microprocessor computer chip in the plastic of the card to greatly increase the card's data storage capacity. Additionally, sophisticated card applications specific to the card issuer can execute in certain varieties of the chips, and the chip may also contain a type of operating system. Transaction cards with embedded chips are referred to in the industry as portable programmed data carriers, more commonly called "smart cards." The chip in a smart card can be programmed with initialization and/or personalization data at the same time as the surface of the card is being embossed and/or printed.

The initialization data for a smart card comprises data common to all cards of a specific type. Such data can include application data, security data, and printed data. The application data is common to all cards for a given card application and can include application program code and common data variables that are programmed into the chip. The security data, usually provided as secure keys or security functions, validates the data on the card and prevents fraudulent use of the card. Printed data, such as a logo, bar codes, and various types of numerical information, can be printed on the surface of the card. Some or all of the same data can also be embossed on, or engraved into, the surface of the card. Optical technology also can be employed to make part of the surface of the smart card into a storage medium with data accessible by an appropriate optical reader.

The personalization information for a smart card is similar to the personalization information currently contained on non-chip transaction cards, such as the cardholder's name, account number, card expiration date, and a photograph. Because of its increased storage capacity, the chip in a smart card may contain additional data beyond the basic information on the standard transaction card, including a graphical representation of the individual's signature, data defining the types of service the cardholder is entitled to, and account limits for those services.

Current transaction and smart card issuing systems are fairly inflexible. Most smart card issuing systems must be tailored to meet the requirements of a specific card application that will be programmed on a specific type of smart card under the control of a specific card operating system and to format the data for the card to be compatible with a specific type of personalization equipment chosen to issue the card. The entire issuing system must be re-configured whenever any one of these variables (issuer application, smart card/card operating system, and/or personalization equipment) is changed, increasing the time and cost incurred by the issuer of the card in delivering personalized smart cards to its customers. Similar limitations regarding the need to re-configure the issuing system are present in non-chip transaction card issuing systems. Additionally, many of the current issuing systems lack a viable means to provide dynamic feedback regarding the status of any particular batch of cards in the process to the card issuer.

An alternative transaction card issuing system which is programmable to work with multiple types of transaction cards, multiple types of personalization equipment, and multiple card applications is described in U.S. Pat. No. 5,889,941, issued on Mar. 30, 1999, assigned to the assignee of the present application. However, the transaction card issuing system described therein requires that a programmer create a specific application to manage the personalization information and to interface with the card issuing system.

Thus, the increasing demand for transaction cards in general, and smart cards in particular, requires a flexible smart card issuing system that provides a simple interface for inputting personalization information.

SUMMARY OF THE INVENTION

The above-mentioned shortcomings, disadvantages and problems are addressed by the present invention, which will be understood by reading and studying the following specification.

A virtual card personalization system uses a plurality of virtual devices to control physical personalization equipment to produce a physical transaction card as defined by a transaction card configuration and personalization data. The virtual devices use the transaction card configuration to convert the personalization data into format(s) recognizable by the physical personalization equipment. A method of personalizing transaction cards using the plurality of virtual devices, the transaction card configuration and the personalization data is described. In one aspect of the invention, the transaction card configuration is specified in a virtual transaction card.

The virtual card personalization system is described in terms of objects which have methods and properties that are manipulated to cause the objects to process the data necessary to personalize a transaction card. In one aspect of the invention, a particular arrangement of objects comprising the virtual card personalization system is described. In another aspect, the invention is described as components which receive data and instruct physical personalization equipment to produce a transaction card based on the data. Various configurations of the components that are driven by scripts (written in high-level user-friendly scripting languages) or interactive user input are described.

A data structure for one embodiment of a virtual transaction card is also described.

The virtual card personalization system does not require that a user develop a full transaction card personalization application. Instead the user manipulates the virtual card object to define the desired transaction card and configures the virtual device objects to reflect the physical personalization equipment present in the production environment through interactive input or simple scripts. When the production environment changes, the user simply changes the configuration of the corresponding virtual device object(s). Thus, the virtual card personalization system presents a conceptual model of the personalization process to the user and permits the user to quickly and easily change the model without having to resort to complicated programming languages or understand complex file formats.

The present invention describes computer systems, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 5A, 5B, 5C, 5D and 5E are diagrams illustrating alternate embodiments for a programming interface for the virtual card personalization system shown in FIG. 2.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

The leading digit(s) of reference numbers appearing in the Figures corresponds to the Figure number, with the exception that the same reference number is used throughout to refer to an identical component which appears in multiple Figures. Signals and connections may be referred to by the same reference number or label, and the actual meaning will be clear from its use in the context of the description.

The detailed description is divided into five sections. The first section describes a sample computer hardware and operating environment suitable for practicing the virtual card personalization system of the present invention. The second section presents a system level overview of the virtual card personalization system. The third section provides methods performed by computer hardware in actualizing the virtual card personalization system. The fourth section describes a particular implementation of the invention using Microsoft Incorporated's Automation facility. Finally, the fifth section provides a conclusion of the detailed description.

Hardware and Operating Environment

Figure 1:
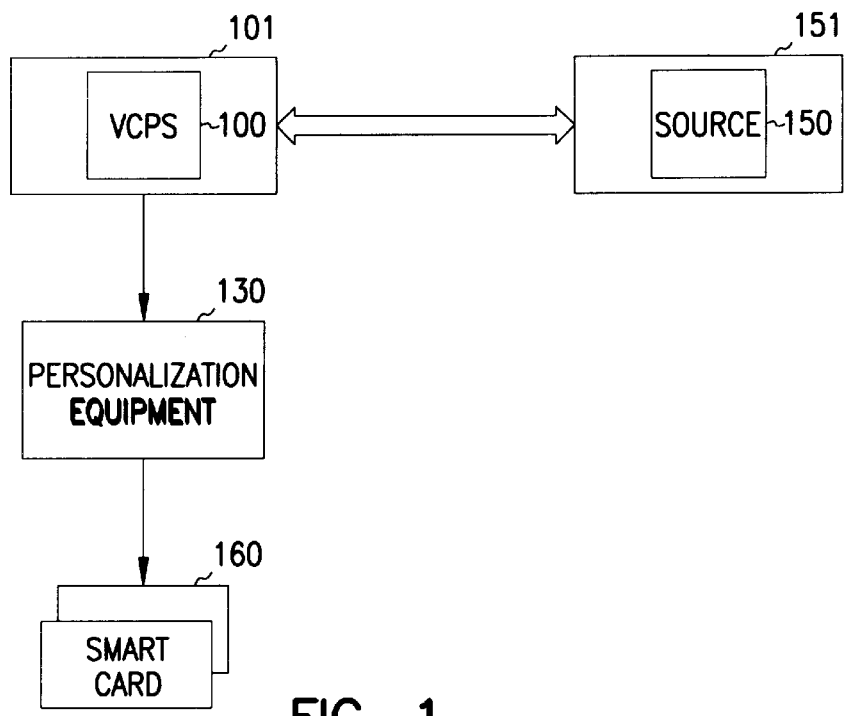
FIG. 1 shows a diagram of the hardware and operating environment in which embodiments of a virtual card personalization system of the present invention may be practiced.

FIG. 1 is a diagram of the hardware and operating environment in conjunction with which embodiments of the invention may be practiced. The description of FIG. 1 is intended to provide a brief, general description of suitable computer hardware and a suitable operating system environment for implementing the virtual card personalization system. Although not required, the invention is described in the general context of computer-executable instructions, such as program modules, being executed by a processor of a computer, such as an industry-standard workstation and/or personal computer. Generally, program modules include routines, programs, objects, components, data structures, etc., that perform particular tasks or implement particular abstract data types. The program modules execute under an operating system such as Unix, Windows 95©, or Windows NT©. The computer has a common configuration which includes computer-readable media such as a mass storage device (such as a hard disk, CD-ROM, and/or floppy disk) and memory coupled to the processor through a system bus. Additional connections to external devices, such as a display monitor, keyboard, mouse, and a printer, are also considered standard in such configurations.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The virtual card personalization system 100, executing on a local computer 101, receives information to personalize a transaction card from an external data source 150 (such as an application executing on a remote computer 151), processes the information, and sends the processed information to personalization equipment 130 which personalizes the transaction cards 160. The external data source 150 is shown as a computer program in FIG. 1, but the virtual card personalization system 100 is capable of receiving information from alternate inputs. Such alternate inputs include computer media, i.e., magnetic tape, floppy disk, or CD ROM, an on-line connection, i.e., a general switched telephone network, a packet-switched network (the Internet) a dedicated line, a cable/satellite television signal, or through a user typing the information into the local or remote computers. Additional alternate inputs will be apparent to those skilled in the art.

The virtual card personalization system 100 controls physical devices, such as card printers, embossing devices, and integrated or add-on transaction card interface devices, which are collectively represented in FIG. 1 as personalization equipment 130. Personalization equipment 130 also represents such devices as large volume card printer/embossers, small volume card printer/embossers, automatic teller machines (ATMs), point of sale terminals, unattended kiosks, personal computers, network computers, and on-line telecommunication devices. The physical connection between the computer executing the virtual card personalization system 100 and the physical personalization equipment 130 devices varies according to the manufacturer and model of the device. Common industry standard connections include parallel, serial RS232, SCSI (Small Computer System Interface), Ethernet, and serial TTL (Transistor-Transistor Logic). In addition, some devices require a proprietary bus connection.

The connections between the transaction card personalization system 100, the external source system 150 and the personalization equipment 130 can also be implemented through standard local area networks, wide area networks, dedicated phone lines, or other remote communication infrastructure used to transfer data. Alternate connections will be apparent to those skilled in the art and are within the scope of the invention.

System Level Overview

Figure 2:
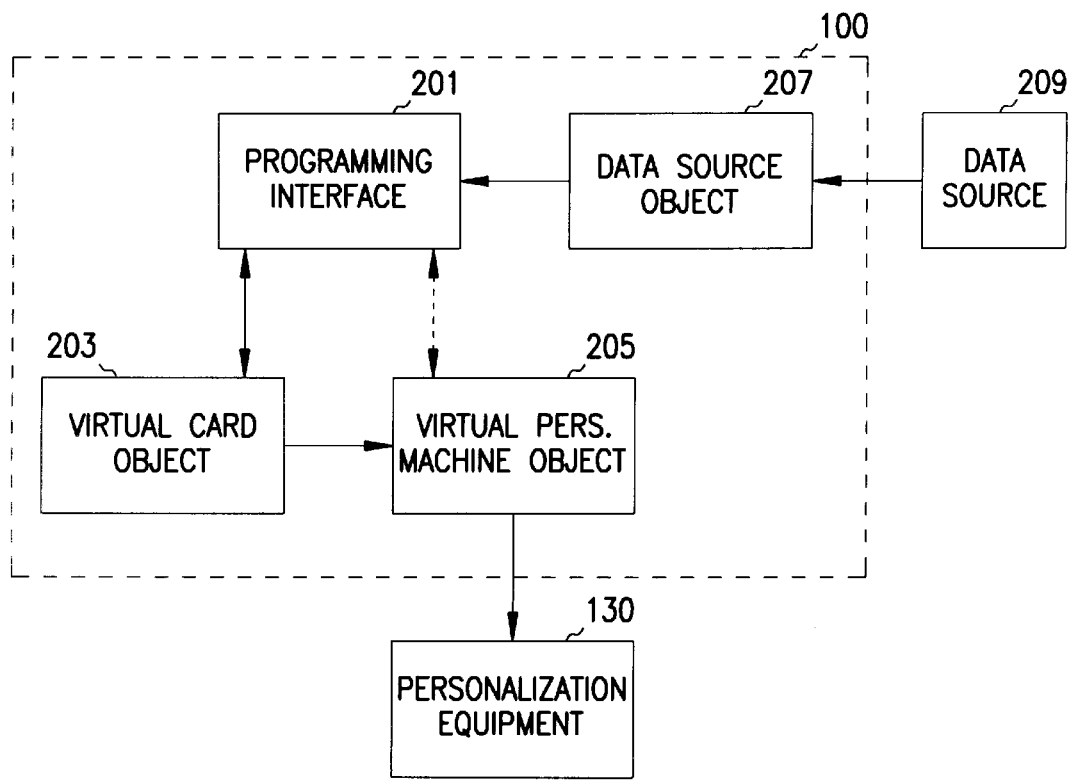
FIG. 2 is a diagram illustrating a system-level overview of the virtual card personalization system.

Referring first to FIG. 2, a system level overview of the operation of one embodiments of the virtual card personalization system 100 is described. FIGS. 3–5D illustrate specific embodiment of the components of the virtual card personalization system 100. The virtual card personalization system 100 is described in terms of logical objects such as those used in object-oriented programming and operating environments. An object is an encapsulated module of code and related data which is externally accessible through well-defined and controlled connection points, known as the object's methods and properties, which the object "exposes" to other objects and external programs. The values of an object's data defines the object's "state." A facility external to the object can determine the object's state and optionally modify that state by specifying the object's methods and properties in a message directed to the object.

One of skill in the art will immediately perceive that the invention is not limited to practice using only existing object-oriented technologies and is applicable to any programming methodology in which physical objects are represented by discrete functions and related data.

The virtual card personalization system 100 comprises three main components, a programming interface 201, a virtual card object 203 and a virtual personalization machine object 205. The virtual personalization machine object 205 is connected to, and controls, the physical personalization equipment 130 to produce a transaction card 160. As shown in phantom in FIG. 2, the programming interface 201 also can directly control the virtual personalization machine object 205. Additionally, a data source object 207 can be used by the programming interface 201 to access data on an external data source 209. The virtual card object 203 is created by the programming interface 201 for a specific transaction card and passed to the virtual personalization machine object 205 which uses the information in the virtual card object 203 to control the physical personalization equipment 130 to produce the transaction card. Thus, the virtual card object 203 defines the configuration of the transaction card.

Figure 3:
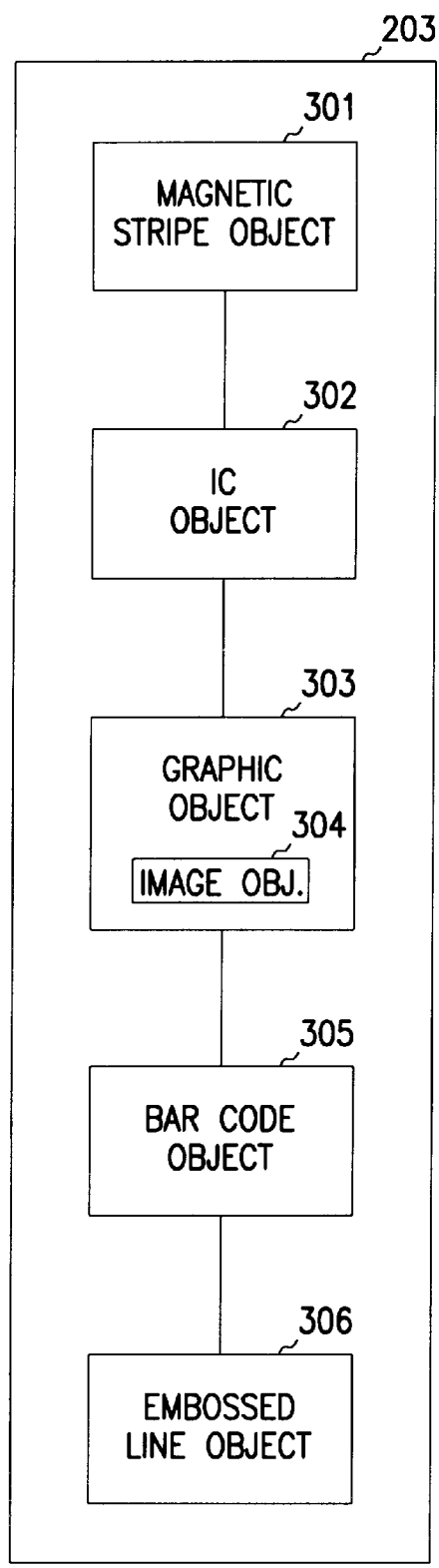
FIG. 3 is a diagram illustrating one embodiment of a virtual card object of the virtual card personalization system shown in FIG. 2.

Turning now to FIG. 3, one embodiment of the virtual card object 203 is shown that comprises five sub-objects: a magnetic stripe object 301, an integrated circuit (IC) object 302, a graphic object 303, an image object 304, a bar code object 305, and an embossed line object 306. The magnetic stripe object 301 and the IC object 302 define the corresponding magnetic stripe and integrated circuit on the transaction card, and contain data which will be programmed into them. The graphic object 303 contains the image object 304 defining a graphical image, such as a logo, alphanumeric text, or the cardholder's picture, which will be printed on or in (e.g. laser engraved) the transaction card. The bar code object 305 contains the information necessary to create bar codes of multiple varieties on the transaction card. The embossed line object 306 specifies text, such as a cardholder name, expiration date, etc., which will be embossed on the transaction card. Thus, the sub-objects 301–306 define the attributes of a particular type and instance of a transaction card. A particular embodiment for each of the sub-objects 301–306 is described in the fourth section below.

As will be readily apparent to one skilled in the art, multiple instances and various combinations of the sub-objects 301–306 can be necessary to personalize a transaction card depending on the configuration of the transaction card and the information desired to be placed on the transaction card. Furthermore, the virtual card object 203 is not limited to only the sub-objects 301–306 and is contemplated as containing sub-objects representative of additional card attributes containing new types of information which will become desirable on future transaction cards.

In the present embodiment, the sub-objects 301–306 which are necessary for the personalization of a transaction card are created and placed within the virtual card object 203 before it is passed to the virtual personalization machine 205. Alternate embodiments in which some or all of the necessary sub-objects are created by the virtual personalization machine 205 are contemplated as within the scope of the invention.

Figure 4:
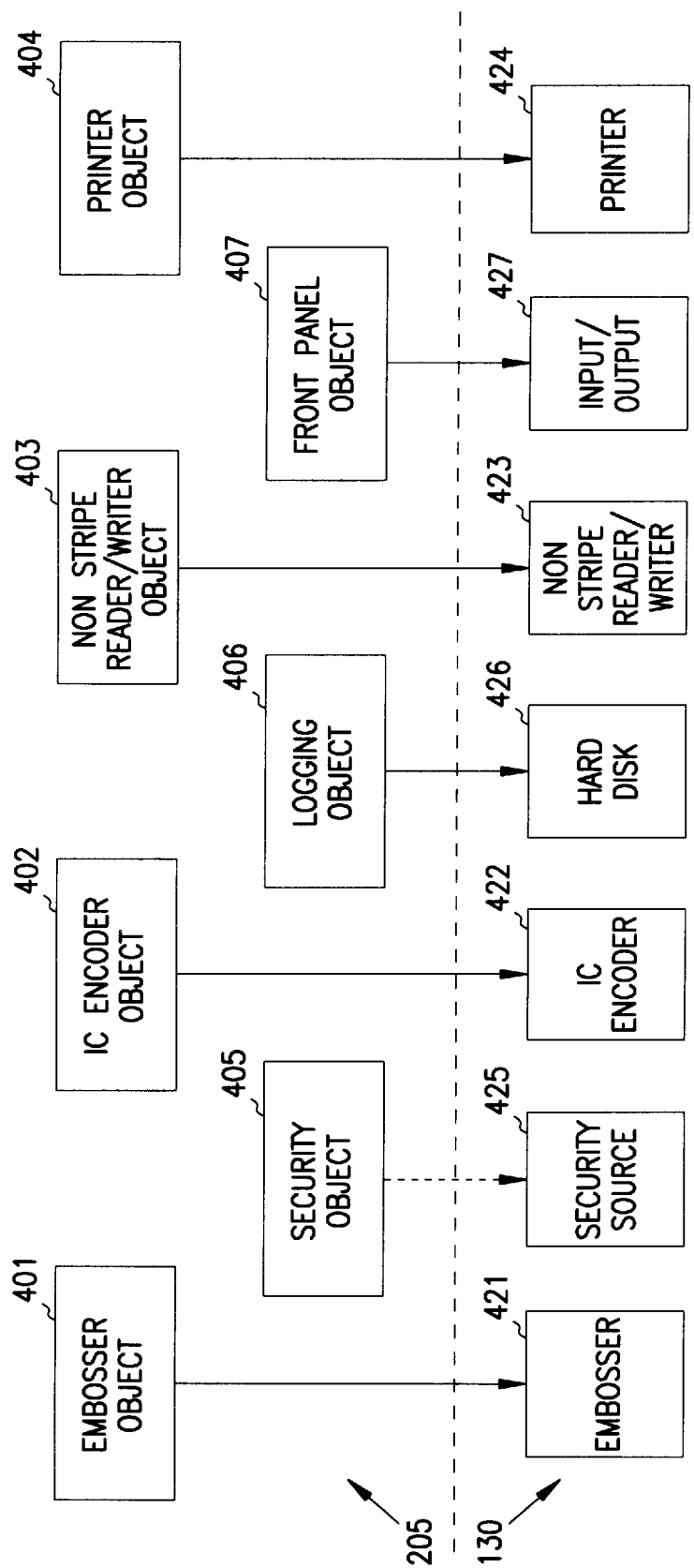
FIG. 4 is a diagram illustrating an embodiment of a virtual personalization machine object and physical personalization devices for the virtual card personalization system shown in FIG. 2.

As shown in FIG. 4, the virtual personalization machine 205 comprises multiple virtual device sub-objects 401–407 which are used to control corresponding physical devices which make up the personalization equipment 130. A virtual device sub-object can control a single physical device or a set of physical devices used for the actual personalization of a transaction card. Each of the virtual device sub-objects 401–407 takes information from a corresponding virtual card sub-object, translates information into data format(s) acceptable to the physical device(s), if necessary, and sends the data and commands to the physical device(s). Note that a single physical device which performs multiple personalization functions, such as printing, encoding, and embossing, can be controlled by more than one virtual device sub-object 401–407 with each of the sub-objects 401–407 being responsible for the corresponding function on the physical device. As discussed above, the physical connection between a virtual device sub-object 401–407 and the physical device it controls can be through a local connection, such as serial or parallel ports on the computer executing the virtual personalization machine 205, or through a networked connection, such as a LAN or WAN. When a multi-function physical device is utilized, a single connection can be shared between all the virtual device sub-objects 401–407 that control functions on the physical device.

An embosser object 401 passes data in the embossed line object 306 to a physical embosser 421. An IC encoder object 402 controls the programming of the integrated circuit on the transaction card by a physical IC encoder 422. A magnetic stripe reader/writer object 403 controls a physical magnetic stripe reader/writer 423 to both read data from, and write data (contained in the magnetic stripe object 301) to, the magnetic stripe on the transaction card. A printer object 404 controls a physical printer 424 which places non-embossed information, such as graphics, images, text and bar codes, from the graphic and bar code objects 303, 305 on the transaction card.

As will be readily apparent to one of skill in the art, if a sub-object is not present in the virtual card object, the corresponding virtual device object is not used for that particular transaction card. Similarly, if the virtual card object contains more than one instance of a type of sub-object, then the method of corresponding virtual device object is invoked more than once.

The virtual device objects 405–407 are present in the virtual personalization machine 205 when the particular transaction card being personalized or the design of the virtual card personalization system requires their functions. Alternate embodiments combining the virtual device objects 405–407 in various ways are therefore contemplated as within the scope of the invention as will be readily apparent to one skilled in the alt.

A security object 405 is responsible for performing various functions necessary to enable any security required by the transaction card and/or the applications stored on the transaction card. In one embodiment, the security object 405 interfaces with a security source 425 which generates key sets, encrypts/decrypts, and signs/verifies data to secure the transaction card from tampering. In an alternate embodiment, the security object 405 communicates information regarding the security source 425 to the virtual personalization machine 205 and vice versa so that the security source 425 and the virtual personalization machine 205 can establish a secure channel between them to exchange security information. In a further alternate embodiment, any security keys necessary to unlock/relock the transaction card during personalization are specified in a script so the security object 405 is not required. Scripts are discussed in more detail below in conjunction with FIGS. 5A–E.

A logging object 406 controls a computer peripheral, such as hard disk 426, which is used to create an error log or an audit trail to monitor the processing of the virtual card personalization system 100. The computer peripheral can be a computer-readable storage device for permanent logging or can be an output device such as a printer. An optional front panel object 407 (shown in phantom) interfaces with user access device 427. The user access device 427 can be a monitor/keyboard combination which permits a user to control the operation of the virtual personalization system 100 from the local computer executing the system 100.

Turning now to FIGS. 5A–E, the components which comprise the programming interface 201 in various embodiments are described in conjunction with the external facilities with which the programming interface 201 is designed to interact. Because the external facilities require knowledge of the objects in the virtual card personalization system 100, the objects expose their methods and properties to the components making up the programming interface 201 for use by the external facilities.

FIG. 5A illustrates one embodiment of the programming interface 201 comprising a local script interpreter 501 executing on the local computer. The local script interpreter 501 interprets commands in a script 503 written in industry-standard scripting languages such as Microsoft® Visual Basic® or JScript™. The commands are interpreted into object messages which manipulate the virtual card object 203 and the virtual personalization machine object 205.

In an alternate embodiment shown in FIG. 5B, the programming interface 201 comprises the local script interpreter 501 and a local application interface 502. The local application interface 502 communicates to a corresponding remote application interface 521 which is part of an application 520 executing on a remote computer. Both the local and remote application interfaces 502 and 521 generate object messages which manipulate application object(s) 523 on the remote computer, and the virtual card object 203 and the virtual personalization machine object 205 on the local computer. The application objects 523 contain information, such as cardholder data, necessary to personalize a transaction card, and can be manipulated by the script 503 through the connection between the local and remote application interfaces 502 and 521. Each application interface 502 and 521 is responsible for passing messages generated by the other application interface to the appropriate objects in its local space.

Figure 5C:
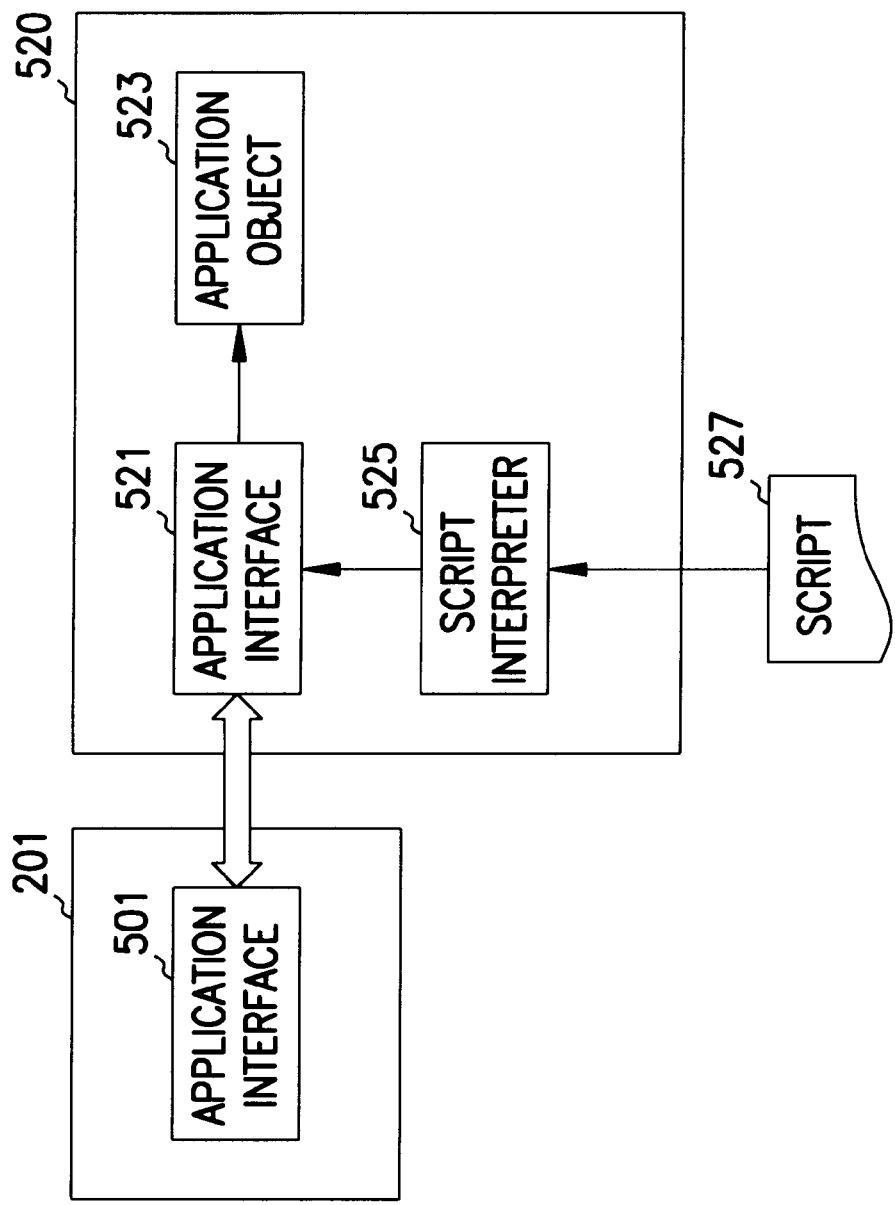

In still a further embodiment illustrated in FIG. 5C, a remote script interpreter 525 also executes on the remote computer. The remote script interpreter 525 is connected to the remote application interface 521 and interprets a script 527 which manipulates the application object(s) 523, the virtual card object 203, and the virtual personalization machine object 205 through the application interfaces 501 and 521.

A fourth alternate embodiment (FIG. 5D) provides a remote interactive interface 529 (shown as a monitor/keyboard combination) to receive input from a user. The remote application interface 521 converts the input into the appropriate object messages to manipulate the application objects 523, the virtual card object 203, and virtual personalization machine object 205. This embodiment enables interactive control of the virtual card personalization system 100 by the user of the remote computer.

Figure 5D:
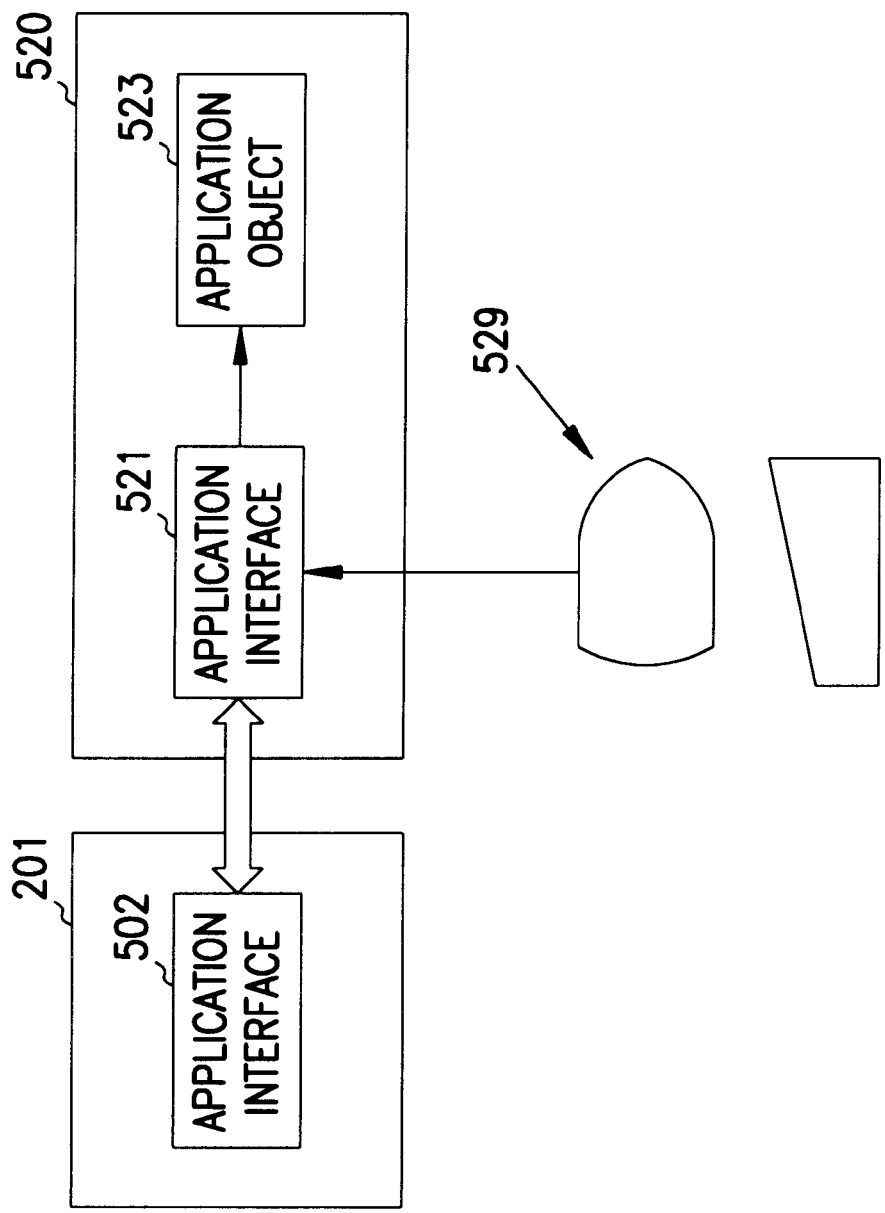
Figure 5E:
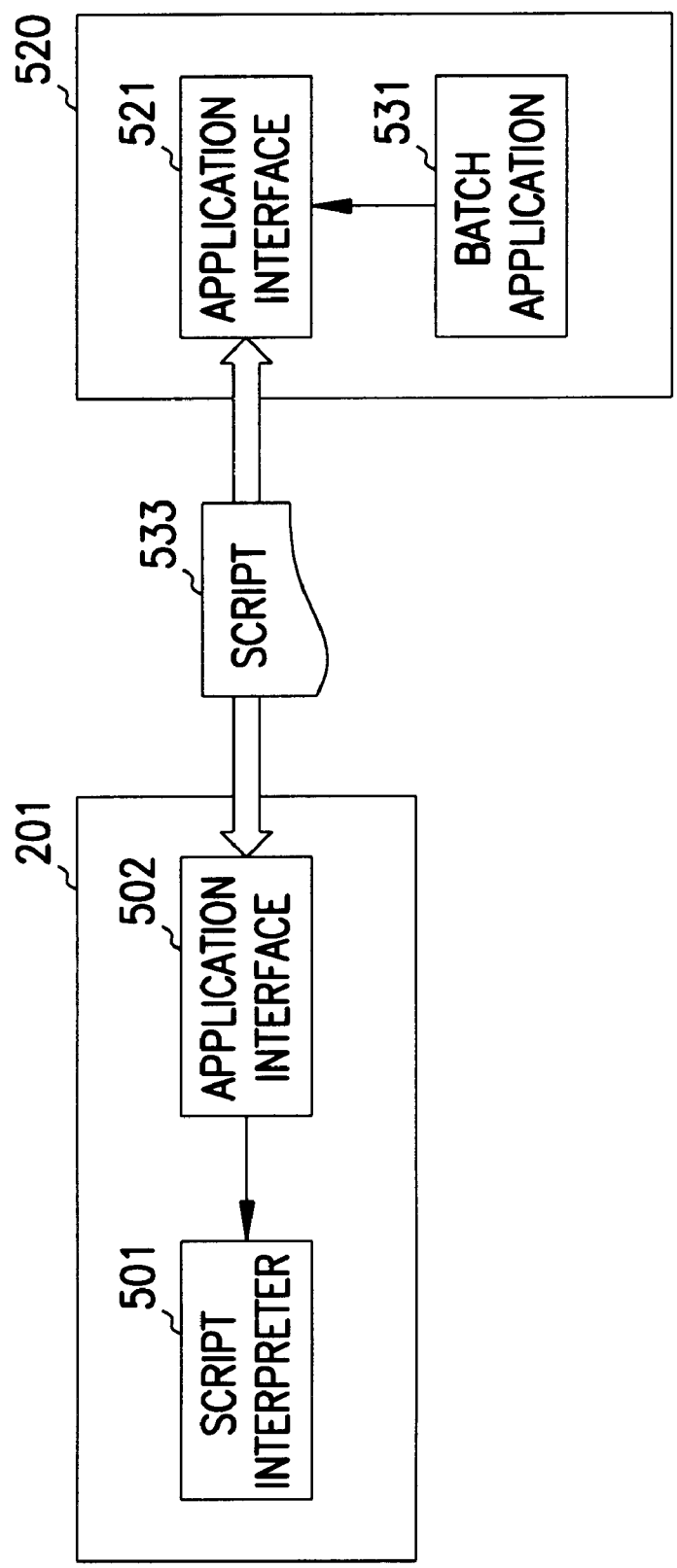

In yet another alternate embodiment shown in FIG. 5E, a batch-oriented application 531 executing on the remote computer controls multiple instances of the virtual card personalization system 100 executing on the local computer through one or more script(s) 533 controlled by the application 531, thus providing for parallel processing. The local application interface 502 for each instance of the virtual card personalization system 100 receives a message from the remote application interface 521 which specifies the location of the script and the local script interpreter 501 interprets the commands in the script. Alternatively, the location of the script to be executed by the instance of the virtual card personalization system 100 is supplied as a command-line argument when the instance is instantiated though a command from the batch-oriented application 531.

An example of the personalization process for a transaction card is described next with reference to the personalization environment shown in FIG. 5B and the objects shown in FIGS. 2–4. The virtual card personalization system 100 is first configured for the particular physical environment that is used to produce the transaction card. The properties of the virtual personalization machine 205 and the virtual device objects 401–407 are set to reflect the personalization equipment 130 and other hardware present in the environment through the script 503. Alternatively, a separate initialization script can be written to set the properties to the environment.

The particular type of transaction card is defined by calling the methods and setting the properties of the virtual card object 203. The programming interface 201 acquires the card holder's personalization information from the data source object 207, which was created by the remote application interface 521 from the application object(s) 523 and passed to the local application interface 502. The programming interface 201 invokes a "make card" method for the virtual personalization machine 205 which passes the virtual card object 203 and the personalization information into the virtual personalization machine 205. The "make card" method causes the virtual personalization machine 205 to convert the personalization information into the appropriate formats for the physical devices 421–424 which will place the information into/on the transaction card. The virtual personalization machine 205 then invokes the methods of the appropriate virtual device objects 401–404 which in turn cause the virtual device objects to instruct the physical devices they control to produce the transaction card based on the converted personalization information and the type of card defined by the virtual card object 203.

The virtual personalization machine 205 has a default personalization process which can be modified by specifying custom procedures in the script 503. Additionally, the direct manipulation of the virtual device objects 401–407 in the virtual personalization machine is possible. When the virtual device objects 401–407 are directly manipulated by the script 503, the virtual card object 203 is not used; instead the script 503 invokes the methods of the virtual device objects appropriate to the desired transaction card. Thus, the script 503 defines the transaction card configuration. One of skill in the art will readily appreciate that the direct manipulation of one or more of the virtual device objects can be used in conjunction with the virtual card object 203 when a more "fine-grained" control over the virtual device object(s) is needed.

The system level overview of an example virtual card personalization system has been described in this section of the detailed description. The virtual card personalization system comprises three components, and interfaces with external applications and physical personalization devices to personalize transaction cards. While the invention is not limited to any particular software methodology, for sake of clarity, simplified object-oriented embodiments have been described.

Methods of an Exemplary Embodiment of the Invention

The previous section described a system level overview of the operation of various embodiments of the virtual card personalization system. In this section, the particular methods performed by a computer, such as local computer 101 in FIG. 1, executing such embodiments are described by reference to a series of flowcharts. The methods to be performed by the computer constitute computer programs made up of computer-executable instructions. Describing the methods by reference to a flowchart enables one skilled in the art to develop such programs including such instructions to carry out the methods on suitable computers which execute the instructions from computer-readable media. The term "method" is used interchangeably in this section to refer to the methods of one or more of the objects in the virtual card personalization system 100 and also to refer to the computer-instructions executed by programming interface 201. The appropriate meaning will be clear to one skilled in the art through the context of the usage.

Figure 6A:
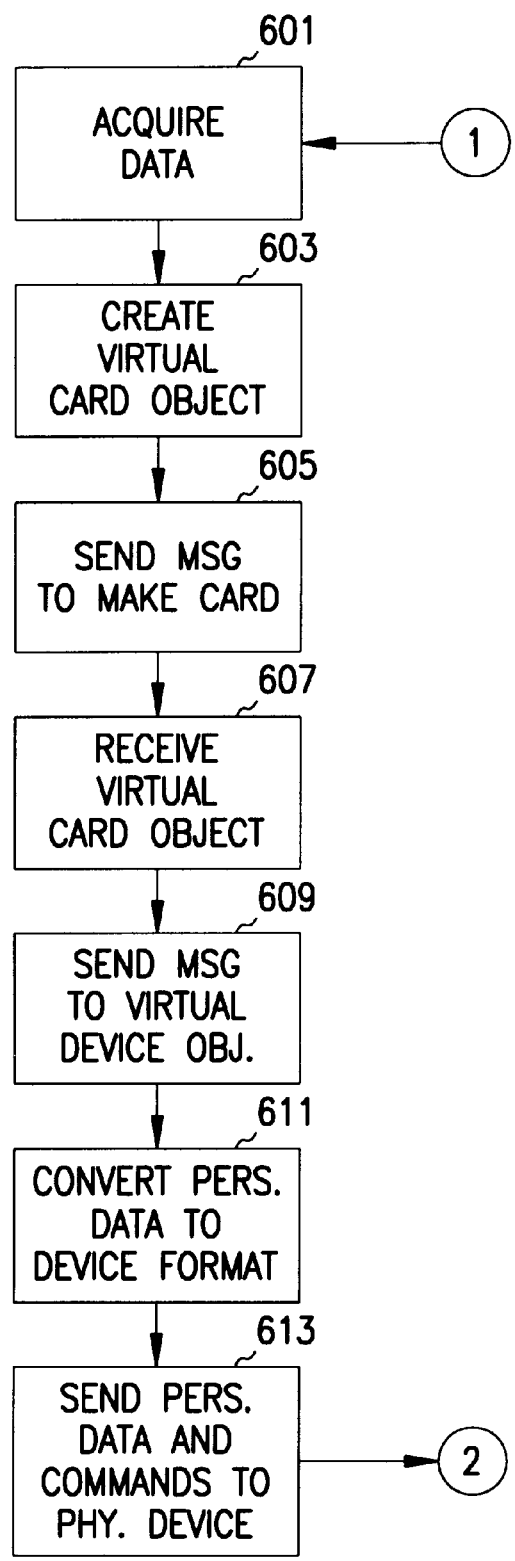
FIG. 6 is a flowchart of a method to be performed by a computer according to one embodiment of the virtual card personalization system.
Figure 6B:
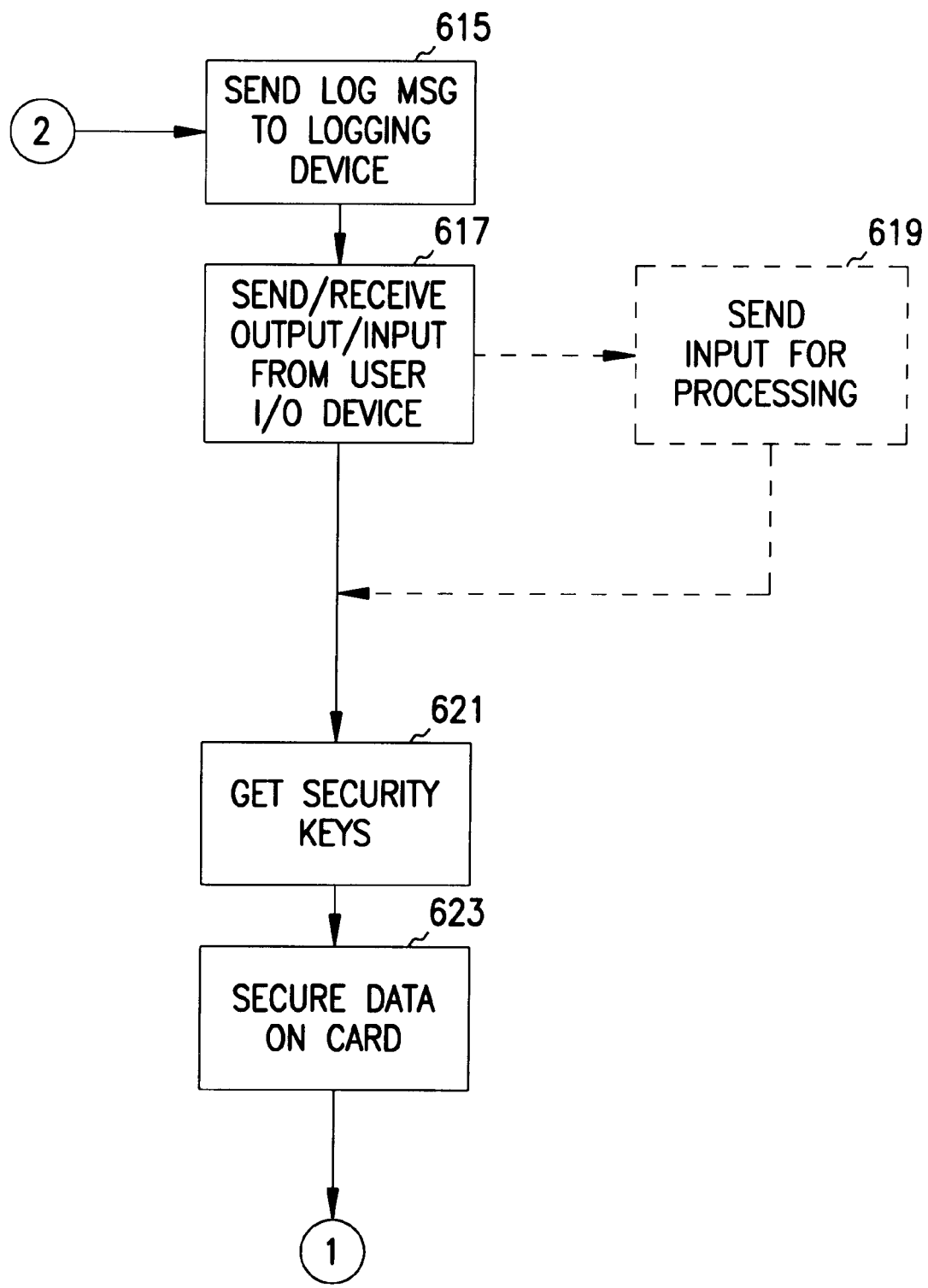

Referring first to FIG. 6, a flowchart of one embodiment of a method to be performed by a computer to implement the virtual card personalization system 100 is described. The programming interface 201 acquires the data to be personalized from the external application 520 or the data source 209 (block 601). The programming interface 201 creates the virtual card object 203 from the data by creating the appropriate sub-objects 301–306 and setting their properties (block 603). The programming interface 201 instructs the virtual personalization machine object 205 to make the transaction card by passing a message referencing the virtual card object 203 to the virtual personalization machine object 205 (block 605).

The virtual personalization machine object 205 receives the message(s) (block 607) and informs each virtual device object 401–404 of the need to process the personalization data contained within the corresponding sub-object 301–306 through a message that references the sub-objects (block 609). Each virtual device object 401–404 converts the data in the corresponding sub-object into the format(s) recognizable by the physical device it controls (block 611) and sends the appropriate commands and data to the physical device to cause the physical device to personalize the transaction card (block 613).

The virtual personalization machine object 205 also sends messages to the logging object 406 (block 615) and the front panel object 407 (block 617) that cause those objects to output text to the physical devices 426 and 427 they control. The front panel object 407 also receives input from the physical device 427 at block 617, and sends a message containing the input to the virtual personalization machine object 205 for processing (block 619).

The security object 405 is responsible for obtaining security keys (block 621) and for sending and receiving data to and from the security source 425 for encrypting/decrypting, and signing/verifying the data when instructed to do so by a message from the virtual personalization machine object 205 (block 623). The timing of the messages to the security object 405 is dependent upon the type of data being used to personalize the transaction card. For example, when the cardholder's PIN (personal identification number) is to be stored on the transaction card, the virtual personalization machine object 205 can instruct the security object 405 to encrypt the number prior to its being stored.

The particular methods performed by a computer executing one example embodiment of the virtual card personalization system of the present invention have been described. The methods have been shown with reference to a flowchart including all the blocks from 601 until 623. The invention is not limited by the particular methods described in this section and is intended to cover methods necessary to handle card-specific features which will become desirable in the future.

Microsoft® Automation Implementation

In this section of the detailed description, a particular implementation of the invention is described that relies on the Microsoft® Corp. automation facility available in Microsoft® Windows user applications, such as Excel and Access, to provide the functions of the local and remote application interfaces 502 and 521 shown in FIGS. 5B and 5D and application interfaces 501 and 521 shown in FIG. 5C. In this embodiment, the application objects 523 are spreadsheet cells (Excel) or data base records (Access) holding the data necessary to personalize the transaction card. The Microsoft® automation facility exposes the methods and properties of the application objects 523, the virtual card object 203, and the virtual personalization machine object 205 so that they can be manipulated by a script, such as local or remote scripts 503 or 527, or through a graphical user interface executing on a remote computer, thus providing a user with interactive access to the objects. The scripts are written in an industry-standard scripting language such as Microsoft® Visual Basic® or JScript™.

The particular methods and properties of the objects and sub-objects comprising the Microsoft® automation implementation of the virtual card personalization system 100 are described next with reference to the objects and sub-objects described in FIGS. 2–4. One of skill in the art will immediately recognize that the methods and properties described next can be modified to adapt the automation implementation to various transaction card production environments without departing from the scope of the invention. Furthermore, one of skill in the art also will readily appreciate that the virtual card sub-objects and virtual device objects described in FIGS. 3 and 4 can vary depending on the production environment.

In the present embodiment, the virtual card personalization system exposes a CreateCard method which is invoked by a script or by the programming interface to create an instance of a virtual card object. The sub-objects are created within the virtual card object through methods particular to each sub-object necessary to personalize the transaction card represented by the virtual card object. The method CreateMagStripe is invoked with data to be placed in the magnetic stripe to create a new magnetic stripe object ("MagStripe"); the method CreateIC is invoked with the attributes of the integrated circuit on the card to create a new IC object; the method CreateGraphic is invoked with graphical data to create a new graphic object with an embedded image object; the method CreateBarCode is invoked with bar code data to create a new bar code object ("BarCode"); and the method CreateEmbossedLine is invoked with a text string to create a new embossed line object ("EmbossedLine").

The programming interface uses data supplied by the data source object to set the properties of the sub-objects for the particular transaction card being issued. In the present embodiment, the virtual card object also contains an additional property, ActivationSticker, which is set if an activation sticker is to be placed on the transaction card during the personalization process.

The MagStripe object contains properties that define the contents of the tracks of the magnetic stripe and its attributes, such as the number of tracks and their placement within the stripe.

The IC object exposes methods which are used by the programming interface to define files in the integrated circuit that contain data for the card applications that execute on the chip (CreateEF, CreateDF). The IC object also exposes properties which define the integrated circuit, such as its type (CPU), the types of memory in the chip (ROM, EEPROM, RAM), and the operating system on the chip (OS).

One of skill in the art will immediately recognize that the methods and properties of the IC object will vary depending on the integrated circuit itself, and the specialized card applications with which it can be programmed. Such specialized methods and properties are contemplated as within the scope of the invention. For example, if the transaction card contains an integrated circuity which has only memory and no processing capacity, the IC object exposes properties for the memory but has no properties that are specific to a microprocessor (e.g., an operating system).

The Graphic object exposes properties that specify the placement of the image defined by the Image object contained within the Graphic object. In the present embodiment, the Graphic object exposes Cartesian-based position coordinates (X,Y) relative to the upper-left corner of the image, but the use of alternate coordinates systems and/or different relative positioning will be readily apparent to one skilled in the art. The Graphic object also exposes a Side property which specifies on which side of the card the image is to be placed.

The Image object exposes properties which define the source of the image and its format. In the present embodiment, addresses for various sources of the image include a directory path address to a image stored on local mass storage, a UNC (uniform naming convention) address for an image stored on a local area network, or a URL (universal resource locator) address for an image stored on a wide-area network such as the Internet. The format for the image can be any of the commonly-used image formats, such as GIF or TIFF, or a proprietary image format.

Because the BarCode and the EmbossedLine objects are positioned on the card in a similar fashion to the Graphic object, they expose similar placement properties. The BarCode object has additional properties (Value, Type) which define the bar code. Similarly, the EmbossedLine object has additional properties that determine how text is to be embossed on the card. In the present embodiment, the EmbossedLine object has a Text property which is set to the data string to be embossed, a Font property, and a Color property.

In the present embodiment, after setting up the virtual card object, the programming interface invokes a MakeCard method in the virtual personalization machine object to cause the creation of a transaction card specified by the virtual card object The virtual personalization machine object invokes methods exposed by the virtual device objects to create the transaction card from the sub-objects in the virtual card object and to perform other functions associated with the production of a transaction card. The methods and properties of the virtual device objects are described next.

The Embosser object exposes a method (PutLine) which is invoked to send the text in the EmbossedLine object to the physical embosser device.

The ICEncoder object exposes power methods (PowerUpCard, PowerDownCard) that are invoked to direct the physical IC encoder device to provide/remove power to/from the integrated chip on the transaction card, and command methods (SendCommand/GetResponse) to send commands and receive responses to/from the integrated chip. In addition, the ICEncoder object exposes other methods specific to encoding memory-only transaction cards since these cards have no processing capability. The IC sub-object is passed to the IC encoder object which uses the information defining the particular integrated circuit to convert the commands into a format recognizable by the integrated circuit.

The MagStripeReader/Writer object exposes two methods (ReadTrack/WriteTrack) which cause the physical magnetic stripe reader/writer read and write data passed into the MagStripeReader/Writer object from/to the specified track in the magnetic stripe on the transaction card. A Print-Graphic method instructs the Printer object to print non-embossed graphical data defined by the graphical and/or bar code sub-objects on the transaction card using the physical printer.

As described above, a Security object is specific to the security requirements for a particular transaction card and any transactions stored on the transaction card. Thus, the methods exposed by the Security object in the present embodiment are dictated by the required security. Particularly contemplated in this embodiment are methods which are compliant with existing and developing security implementations such as the Public Key Cryptography Standard (PKCS) #11: Cryptographic Token Interface Standard, PC/SC (Personal Computer/Transaction card) Workgroup, etc.

When the virtual personalization machine is required to record information regarding the personalization process, such as errors or statistics, it invokes a PutMessage method specifying the information to instruct the Logging object to write the information to the appropriate physical computer peripheral device. Multiple computer peripheral devices can be used simultaneously as logging devices with the Logging object, or objects, being instructed to write information to a specific device.

The front panel object is invoked to output a message onto the physical user access device (PutMessage). The exact display format of the message depends on the operating environment in which the virtual personalization machine is executing. In the present embodiment executing under Microsoft® Windows, the front panel of one or more of the personalization devices are graphically represented in the user access device. The message is displayed as a text string on the appropriate graphical representation.

The programming interface can also invoke methods exposed by the data source object to access information contained in a source external to the virtual card personalization system, such as a data base, a disk file, or other storage medium, using properties exposed by the data source object to specify the information wanted and commands necessary to obtain it. The methods and properties exposed by the data source object are dependent upon the organizational structure of the information. For example, if the source is an ODBC (open data base connect) database, a Connect method and a Connection property are used to connect to the database, and a Get method and a Query property are used to specify an SQL statement that retrieves the data.

In the present embodiment, each of the virtual device objects also has a Reset method that causes the virtual device object to reset the physical device(s) it controls to a default state. Additionally, each of the virtual device objects has at least one property (PhysicalDevice) which specifies the physical device controlled by the virtual device object, i.e, maps the virtual device object to the physical device. If the virtual device object controls more than one physical device, more than one PhysicalDevice property can be present.

The virtual personalization machine object exposes a Reset method which resets the virtual programming machine object to a default state. A SetMakeProcedure method is also provided which is invoked by the programming interface object to replace the default functions of the MakeCard method with those specified in a custom script. Such an override is desirable when it is necessary, for instance, to accommodate a personalization environment which has complex security requirements or which requires conditional flow control of the personalization process.

Besides the physical devices described above as comprising the personalization equipment 130, the physical device can also be a connection on the computer executing the virtual card personalization system 100 so that the PhysicalDevice property indicates that the virtual device object sends a data stream to the particular connection. For example, when the connection is a standard serial communications port, the data stream is directed to a serial input/output device coupled to the port, such as a modem. Alternatively, the connection can be a data bus coupled to a mass storage device so that the data stream is stored in a file for later access.

In this section, the method and properties of objects in a particular implementation of the virtual card personalization system has been described. The use of the Microsoft® automation facility in this particular implementation has also been described. One of skill in the art will readily recognize that the use of the Microsoft® automation facility which incorporates the functions of DCOM (distributed component object model) as well as COM (component object model) allows the virtual card personalization to be distributed over networked computers. Furthermore, one of skill in the art will immediately appreciate that the functions provided by CORBA (common object request broker architecture) in UNIX operating environments can be substituted for COM/DCOM without departing from the scope of the invention.

Conclusion

A virtual card personalization system has been described that utilizes various logical objects and interfaces to external systems and devices to personalize transaction cards. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

In particular, one of skill in the art will readily appreciate that the names of the methods and properties are not intended to limit the invention. Furthermore, additional methods and properties can be added to the objects, functions can be rearranged among the objects, and new objects to correspond to future enhancements and physical devices used in transaction card production can be introduced without departing from the scope of the invention.

The terminology used in this application is meant to include all object-oriented environments and alternate technologies which provide the same functionality as described herein. Therefore, it is manifestly intended that this invention be limited only by the following claims and equivalents thereof.

It is to be understood that the above description is intended to be illustrative, and not restrictive. Many other embodiments w ill be apparent to those of skill in the art upon reviewing the above description. The scope of the invention should, therefore, be determined with reference to the appended claims, along with the full scope of equivalents to which such claims are entitled.

What is claimed is:

1. A method for personalizing transaction cards comprising:
   configuring a plurality of virtual devices to control physical personalization equipment;
   providing a transaction card configuration to define a physical transaction card;
   acquiring personalization data; and
   processing the personalization data and the transaction card configuration by the plurality of virtual devices to cause the physical personalization equipment to personalize the physical transaction card with the personalization data as defined by the transaction card configuration.

2. The method of claim 1, wherein the transaction card information is contained in a virtual transaction card that is processed by the plurality of virtual devices.

3. The method of claim 1, wherein the processing of the personalization data and the transaction card configuration comprises converting the personalization data into a format recognizable by the physical personalization equipment and sending commands to the physical personalization equipment.

4. The method of claim 1, wherein the physical personalization equipment comprises a plurality of physical devices.

5. The method of claim 4, wherein at least one of plurality of physical devices is selected from the group consisting of an embosser, an integrated circuit encoder, a magnetic stripe reader/writer, and a printer.

6. The method of claim 4, wherein each of the plurality of virtual devices controls one of the plurality of physical devices.

7. The method of claim 4, wherein at least one of the plurality of virtual devices controls more than one of the plurality of physical devices.

8. The method of claim 1, wherein one of the plurality of virtual devices interfaces with a security source.

9. The method of claim 1, wherein one of the plurality of virtual devices controls a reporting device.

10. The method of claim 1, wherein one of the plurality of virtual devices controls a user access device.

11. A computer-readable medium having stored thereon a data structure comprising:
    a first field containing date representing an instance of a physical transaction card;
    a second field containing data representing an integrated circuit on the physical transaction card identified by the first field; and
    a third field containing data representing a magnetic stripe on the physical transaction card identified by the first field.

12. The computer-readable medium of claim 11, further comprising:
    a fourth field containing data representing an attribute of the physical transaction card, wherein the attribute is selected from the group consisting of a graphic, a bar code, and an embossed line.

13. The computer-readable medium of claim 11, further comprising a fourth field containing data representing an indicator that causes an activation sticker to be attached to the transaction card identified by the first field.

14. A computer-readable medium having stored thereon computer-executable components for producing transaction cards on physical personalization equipment comprising:
    a programming interface for creating a virtual transaction card from data received from a data source; and
    a virtual personalization machine logically coupled to the programming interface for instructing the physical personalization equipment to produce a physical transaction card defined by the virtual transaction card.

15. The computer-readable medium of claim 14, wherein the virtual personalization machine comprises a plurality of virtual devices for instructing the physical personalization equipment.

16. The computer-readable medium of claim 14, wherein the programming interface comprises a script interpreter for interpreting a script which controls the production of the transaction cards.

17. The computer-readable medium of claim 14, wherein the programming interface comprises a local application interface for communicating with a remote application interface, wherein the remote application interface supplies information for producing the transaction cards.

18. The computer-readable medium of claim 17, further comprising a remote script interpreter logically coupled to the remote application interface for interpreting a script which controls the production of the transaction cards.

19. A virtual card personalization system comprising:
    a virtual card object defining a physical transaction card;
    a programming interface object for creating the virtual card object from data in a data source object; and
    a virtual personalization machine object for controlling physical personalization equipment to produce a physical transaction card defined by the virtual card object and personalization data in the data source object when a make card method is invoked by the programming interface object.

20. The virtual card personalization system of claim 19, wherein the virtual card object comprises an integrated circuit object and a magnetic stripe object, each object having properties defining a corresponding attribute on the physical transaction card.

21. The virtual card personalization system of claim 20, wherein the virtual card object further comprises at least one object selected from the group consisting of a graphic object, a bar code object and an embossed line object, each object having properties defining a corresponding attribute on the physical transaction card, and the at least one object being created when a specific create object method is invoked by the programming interface object.

22. The virtual card personalization system of claim 21, wherein the graphic object contains an image object having properties defining an image to be placed on the physical transaction card.

23. The virtual card personalization system of claim 19, wherein the virtual personalization machine comprises a plurality of virtual device objects for controlling the physical personalization equipment, each of the plurality of virtual device objects having a method particular to a function of the physical personalization equipment it controls.

24. The virtual card personalization system of claim 23, wherein the plurality of virtual device objects is selected from the group consisting of an embosser object, an integrated circuit encoder object, a mag stripe reader/writer object, a printer object, a security object, a logging object, and a front panel object.

25. The virtual card personalization system of claim 23, wherein the physical personalization equipment comprises a plurality of physical devices.

26. The virtual card personalization system of claim 25, wherein each one of the plurality of virtual device objects controls one of the physical devices.

27. The virtual card personalization system of claim 25, wherein at least one of the plurality of virtual device objects controls more than one of the physical devices.

28. A computerized system for personalizing transaction cards comprising:

a processor;

a computer readable medium coupled to the processor; and personalization equipment coupled to the processor, wherein instructions executed from the computer readable medium by the processor cause the processor to create a virtual transaction card and to configure virtual devices which in turn cause the processor to send data and commands defined by the virtual transaction card to the personalization equipment to personalize a physical transaction card.

29. A virtual card personalization system comprising:

a card configuration means for defining a physical transaction card;

an interface means for acquiring data for the physical transaction card and coupled to the card configuration means;

a virtual personalization machine means coupled to the programming means and further coupled to physical personalization means, the virtual personalization machine means comprising:

a plurality of virtual device means for processing the card configuration means and the data to cause the physical personalization means to personalize the physical transaction card with the personalization data as defined by the card configuration means.

\* \* \* \* \*